United States Patent [19]
Morrison

[11] 3,840,424
[45] Oct. 8, 1974

[54] BELT WITH CAPPED EDGES

[75] Inventor: Howard R. Morrison, Grand Rapids, Mich.

[73] Assignee: Ton-Tex Corporation, Grand Rapids, Mich.

[22] Filed: Mar. 15, 1972

[21] Appl. No.: 234,876

[52] U.S. Cl.............. 161/36, 74/232, 117/44, 156/257, 156/268, 156/293, 161/86, 161/104, 161/119, 161/123, 161/146

[51] Int. Cl............................................ B32b 3/10

[58] Field of Search .......... 156/137, 257, 268, 293; 74/232; 161/43, 44, 45, , 86, 121, 122, 123, 149, 146, 119, 104, 36; 117/44

[56] References Cited
UNITED STATES PATENTS

| | | | |
|---|---|---|---|
| 1,935,817 | 11/1933 | Reynolds | 74/232 |
| 1,998,011 | 4/1935 | Gladwin | 74/232 |
| 3,224,566 | 12/1965 | Elliott | 74/232 |

Primary Examiner—George F. Lesmes
Assistant Examiner—James J. Bell
Attorney, Agent, or Firm—Price, Heneveld, Huizenga & Cooper

[57] ABSTRACT

A capped edge belt and method for making same for belts that must meet sanitary requirements for the food industry, for belts that must operate in very humid or wet conditions in which the method comprises the steps of scoring a groove in the fabric backing of an elongated, multi-layered, composite belt down to the surface of the cover material, filling the groove with a moisture proof material, and bonding the said material to all surfaces of the groove.

14 Claims, 11 Drawing Figures

PATENTED OCT 8 1974    3,840,424
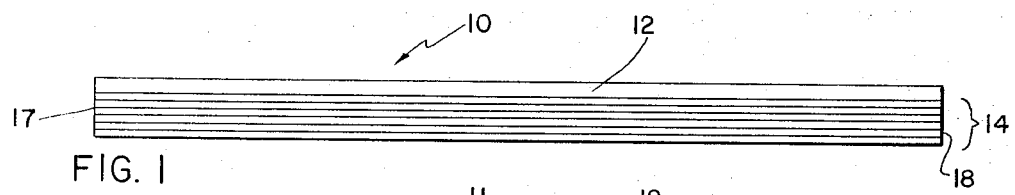
FIG. 1
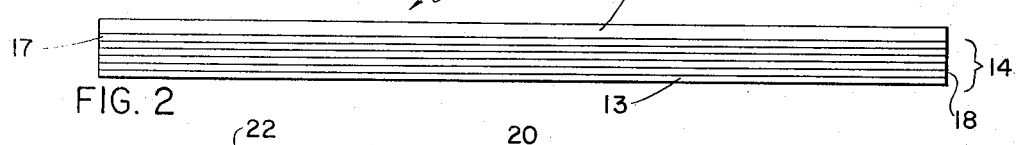
FIG. 2
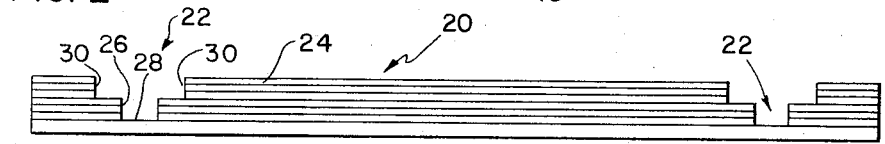
FIG. 3
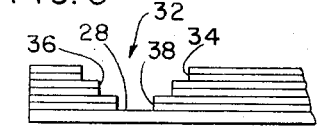
FIG. 4
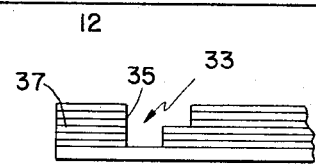
FIG. 5
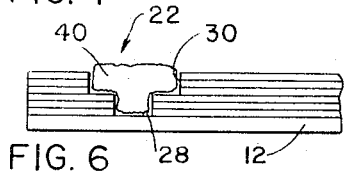
FIG. 6
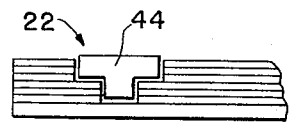
FIG. 8
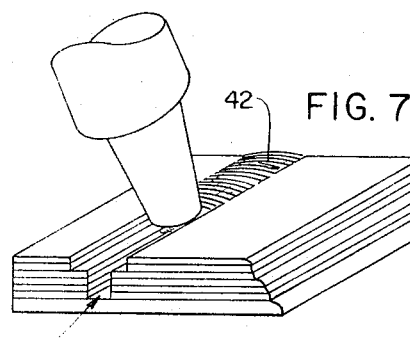
FIG. 7
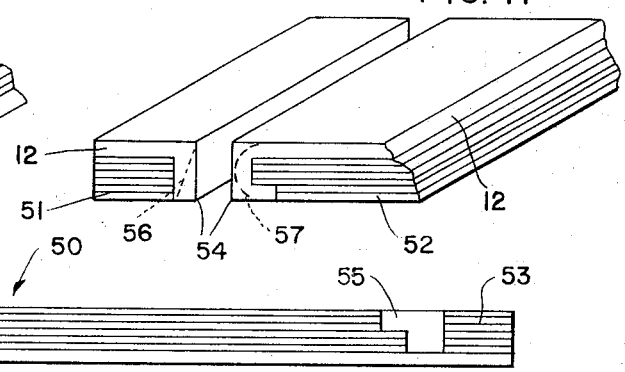
FIG. 11
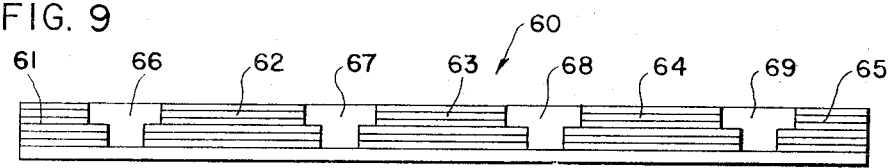
FIG. 9
FIG. 10

BELT WITH CAPPED EDGES

This invention relates to material carrying belts, and more particularly, to material carrying belts having capped edges and a method for manufacturing such belts.

BACKGROUND OF THE INVENTION

It is well-known in the art to utilize material carrying belts having strong, durable, yet flexible carrying surfaces. These belts typically are composed of rubber-like materials with one or more layers or plies of fabric which are exposed on the edges of the belts. In many applications, such material carrying belts with exposed fabric edges are completely acceptable. In many other applications, particularly in the food industry, material carrying belts must be washed and sterilized in order to maintain the highest of sanitary conditions. In such adaptations, the exposed fabric on the belt edges provide a serious obstacle to the maintenance of cleanliness since these exposed edges tend to permit fluids to wick into the fabric core of the belting and such exposed edges are not susceptible to being washed and sterilized as readily as is the carrying surface. Nonetheless, such material carrying belts with exposed fabric edges have been permitted in much of the food industry in the past. New regulations, either in effect or under consideration, require that, in many food industry applications, material carrying belts have no exposed fabric edges. The United States Department of Agriculture has required that belts, used to convey exposed product in federally inspected meat and poultry plants, be of sanitary grade, moisture resistant, non-absorbent material, with no exposed fabric core. Thus, a capped edge belt, which is simply and economically manufactured, has become a necessity in the food industry. At the same time, such capped edge belts are desirable, if not required, in other non-food carrying applications.

Heretofore, belts have been manufactured without exposed fabric on the edges by encapsulating the fabric backing or strength members with rubber or rubber-like material on the top and both edges and, in some cases, on the bottom as well. With this method, the belt must be manufactured complete in the desired width. Such belts cannot be cut to any desired width narrower than the original manufactured width without exposing the fabric backing at the cut edges.

Many belts are cut to the desired width from wider belt stock which is readily available in a variety of belt types, but which usually is manufactured in a nominal standard width such as 48 inch and 60 inch. As a result of being cut to width, these belts will have exposed fabric edges. Several methods have been devised for covering the edges of such belts. One such method is to coat the edges of the belt, after cutting the belt to the desired width, with liquid edge sealer containing solvents which evaporate leaving a coating sealant on the belt edges. Several applications may be required to build-up adequate protection for the belt edges. Belts with edges covered in this manner are not acceptable or permitted in some applications. Another method that has been used to cover the edges of a belt after cutting the belt to the desired width, is to attach a generally U-shaped cap of rubber or rubber-like material over each edge, with vulcanizing cement or other adhesive cement. This cap not only covers the edge, but also extends over a portion of both the top and bottom of the belt adjacent to the edge. Covering a portion of the top or carrying surface of the belt with the edge cap along each edge of the belt is objectionable in some applications. A third method of covering the exposed fabric at the edge of a belt is to remove a portion of the fabric backing at the belt edges and to fold or wrap the top cover over the edges, securing the folded or wrapped portion to the backing with vulcanizing cement or other adhesive cement. Due to the stresses in the folded cover at the edges, anything rubbing against the belt edges may result in the folded cover splitting open thus countering the purpose of this method. As indicated in the above description of methods used heretofore to cover the exposed fabric edges of belts, the results obtained with each of these methods have not been entirely satisfactory.

SUMMARY OF THE INVENTION

Accordingly, it is an object of the present invention to provide a novel belt and method for producing such a belt having capped edges starting with a belt which if cut to desired width would have exposed fabric edges. Another object of this invention is to provide a belt with capped edges in which the original cover or carrying surface of the belt extends to the belt edges. It is yet another object of this invention to provide a belt with capped edges which is susceptible to minimum tooling and production costs.

The novel method described herein basically comprises the scoring of at least one groove in at least one surface of an elongated belt which groove is then filled with a suitable edge capping material either similar or different from the cover material, either of which may be securely bonded to the surfaces of the groove. The belt containing the filled groove is then subjected to any suitable process, such as vulcanization, which process causes the capping material to be bonded to all surfaces of the groove, thereby forming a unified belt. After the belt has been suitably cured, the belt is cut lengthwise along the filled and bonded groove thereby severing the unified belt into two sections each having an edge which is capped with a securely bonded capping material.

This method thereby enables the manufacture of a capped edge belt with minimum tooling and production costs through the process of scoring, filling, vulcanizing or curing, and severing of the unified belt. The result is a belt having capped edges, provided at low cost, which are impervious to food and other related substances and which may be repeatedly cleaned and sterilized for continuous use.

These and other objects, advantages and features of the invention will become apparent from a study of the following description taken in conjunction with the drawings.

BRIEF DESCRIPTION OF THE DRAWINGS

FIG. 1 is a cross-sectional, front elevational view of a typical belt having a cover and exposed fabric edges;

FIG. 2 is a cross-sectional, front elevational view of a typical belt having a cover on both top and bottom surfaces and having exposed fabric edges;

FIG. 3 is a cross-sectional, front elevational view of the same belt shown in FIG. 1 after the groove scoring step of the method;

FIG. 4 is a fragmentary, cross-sectional, front elevational view of a similar belt showing a modified groove;

FIG. 5 is a fragmentary, cross-sectional, front elevational view of a similar belt showing another modified groove;

FIG. 6 is a fragmentary, cross-sectional, front elevational view of a typical belt having a typical groove scored therein in accordance with this invention after the filling of the groove with a mass of edge capping material of a kind that must be vulcanized under heat and pressure;

FIG. 7 is a fragmentary, cross-sectional, front perspective view of a typical belt having a typical groove scored therein in accordance with this invention showing the groove being filled with edge capping material that can be flowed or spread into the groove;

FIG. 8 is a fragmentary, cross-sectional, front elevational view of a typical belt having a typical groove scored therein in accordance with this invention showing the groove filled with a preformed edge capping material;

FIG. 9 is a cross-sectional, front elevational view of a completely unified belt prior to the final step of cutting to form a belt with capped edges;

FIg. 10 is a cross-sectional, front elevational view of a completely unified belt prior to the final step of cutting into its several component belts each with capped edges; and FIG. 11 is a fragmentary cross-sectional, front perspective view of the belt shown in FIG. 9 subsequent to the cutting step.

DESCRIPTION OF THE PREFERRED EMBODIMENT

Referring specifically to the drawings, the figures depict successively the steps involved in the present method of manufacturing a belt with capped edges. Utilizing the belt shown in FIGS. 1 or 2, FIGS. 3, 4 and 5 reveal the grooves scored in the backing surface of the belt. These grooves are subsequently filled with edge capping material as shown in FIGS. 6, 7 and 8, and the belt having the filled grooves is then subjected to a curing or vulcanizing process resulting in the unified belt shown in FIGS. 9 and 10. The completed belt having capped edges is shown in FIG. 11 after the unified belt of FIGS. 9 or 10 is severed through the capping material.

Referring then to the successive figures in more detail, FIG. 1 shows a typical composite, multi-layered material carrying belt 10. Belt 10 comprises a cover 12 and any desired number of fabric backing layers 14. The belt also may have a cover 12 on the top and a cover 13 on the bottom surface, as illustrated by belt 11 in FIG. 2, and these covers may be different in thickness with respect to each other. Typically, the cover 12 may be composed of any several rubber materials such as natural rubber, neoprene rubber, nitrile rubber, polyvinyl chloride, and other rubber or other rubber-like materials. Examples of materials which may be used to form the fabric backing are cotton duck, polyester, rayon, and nylon.

In the manufacture of belt 10, the fabric backing material is impregnated with uncured rubber or rubber-like material. The elongated length of uncured rubber or rubber-like material for the cover 12 and one or more rubber or rubber-like material impregnated fabric backing layers 14 are stacked in the desired arrangement. This stack then is subjected to a vulcanizing process which unifies the belt, curing the rubber or rubber-like material and bonding the cover and each fabric layer to the adjacent fabric layer or layers. This vulcanized, multi-layered, composite rubber and fabric belt then is trimmed along both edges to make a belt of uniform width. This trimmed and ready to use belt 10, as well as any narrower belts split off this trimmed belt, would have exposed fabric on both edges 17 and 18.

In reference to FIG. 3, there is shown a composite belt 20 similar to belt 10 shown in FIG. 1. FIG. 3, however, reveals the first step of the method, that is, the scoring of grooves 22 in the fabric backing surface 24. The scoring is accomplished by cutting out a main section 26 of the fabric backing down to the surface 28 of the cover material 12 by any suitable means. Although this main section 26 could itself be filled and cured or vulcanized to form the capped edge, a stronger and more secure bond may be formed by terracing the sides of main section 26 by removing at least one layer of fabric backing from the fabric backing surface 24, adjacent to and on either side of, the opening of main section 26, thereby forming single terraces 30 on either side of the main section opening 26. Consequently, when the grooves 22 are filled and cured or vulcanized, there is a greater surface area to which the capping material may be bonded when terraces 30 are formed in the sides of the grooves 22.

Similarly, an alternative embodiment 32 of the grooves is shown in FIG. 4. Groove 32 is formed by scoring a plurality of successively narrower troughs within each other. Thus, a wide but shallow trough 34 is scored through one or more layers of the fabric backing. Then, successively narrower trough 36 is scored within trough 34 down through the next layer or layers of fabric backing, with a yet narrower trough 38 scored within trough 36 through the remaining layer or layers of fabric backing down to cover surface 28. Other embodiments of the grooves scored in the backing are available. One such alternative groove 33 is shown in FIG. 5. The edge 35 of the groove 33 need not be stepped or terraced on a narrow belt section 36 that may be discardable.

Following the scoring of the grooves in accordance with this invention and prior to the filling of the grooves with edge capping material, it may be desirable to buff the surface 28 of the cover 12. Moreover, the surfaces of the grooves may have to be treated with a suitable vulcanizing cement or other adhesive cement. Whether or not this treatment is required is dependent largely on the characteristics of the particular edge capping material used, there being a variety of such materials that may be used. The purpose of this treatment, which is not shown in the drawings, is to properly bond the edge capping material to the rubber impregnated fabric backing and to the cover material in the groove along their interfaces.

The next step of the method is to fill the grooves with edge capping material, In FIG. 6, the belt of FIG. 3 has the scored grooves 22 filled with a mass of edge capping material 40 of a kind that would be formed to the configuration of the grooves and be bonded thereto by a vulcanization process. This edge capping material may have any desired form prior to vulcanization, and the grooves may be treated with vulcanizing cement prior to filling the grooves with edge capping material.

An alternative means of filling grooves 22 is shown in FIG. 7. Here the scored grooves 22 are being filled with edge capping material 42 that can be flowed or spread into the groove, thereby filling the groove.

Another means of filling the grooves 22 is shown in FIG. 8 where a preformed edge capping material 44 made substantially to the configuration of the groove would fill the groove and be bonded to the groove by suitable means such as vulcanizing or adhesive cement.

Although not shown in the drawings, the composite belt with grooves scored and filled with edge capping material next undergoes a process which results in the edge capping material generally being unified with the belt. In this process, the rubber impregnated fabric backing, the cover material, and the edge capping material are securely bonded to one another along the interfaces between them in the entire belt.

The familiar hot vulcanization process is used where the edge capping material is of such nature that heat and pressure, characteristic of this vulcanizing process, are required and utilized to cause the edge capping material to conform to the configuration of the grooves, to completely fill the grooves, to bond to all surfaces of the grooves possibly in conjunction with vulcanizing cement, to develop its rubber or rubber-like properties, and generally to be unified with the belt. This hot vulcanization process would be used with the edge capping material 40 used to fill the grooves 22 of FIG. 6. One of the principal advantages of this invention is that the grooves scored in the backing material eliminate the need for any special devices to restrain the edge capping material during the vulcanization process.

Alternatively, the composition of the edge capping material may be such that this material will develop its rubber or rubber-like properties by a curing process that may take place with or without heat or pressure.

The edge capping material 42 shown in FIG. 7 can be spread or flowed into the groove to completely fill the groove, whereupon this material, through its properties, will bond itself to the surfaces of the groove or may be bonded thereto through the medium of a suitable vulcanizing or other adhesive cement. This edge capping material may be material such as unvulcanized rubber mixed with a solvent so as to render it plastic or putty-like in form in which case it will develop its rubber or rubber-like properties by vulcanization under appropriate heat and pressure, or another material such as an adhesive/sealant silicone rubber compound available from Dow Corning Corporation in a range of consistencies from pourable fluids to easily spread paste form, may be used in which case it will develop such properties by curing without pressure at room temperature. Other materials may be used which cure with or without heat and with or without pressure. The specific curing process is dependent on the properties of the edge capping material.

Along with the two processes set forth above, the edge capping material also may be preformed to the shape of the grooves scored in the backing of the belt, as shown in FIG. 8, and this preformed material 44 may be precured and attached to the surfaces of the groove with appropriate adhesives. Such adhesives would cause the edge capping material to be bonded to the surfaces of the groove, thus unifying the edge capping material with the belt, and this adhesive bonding process may involve heat and pressure typical of the vulcanization process, or it may involve heat without pressure or pressure without heat or any combination, the specific bonding process being dependent on the properties of the edge capping material and the adhesives used.

Irrespective of the process used to cause the edge capping material to completely fill the grooves, to be bonded to all surfaces of the grooves, and generally to be unified with the belt, the result is a unified composite belt having at least two fabric backing sections separated by a section of rubber or rubber-like material. Such a unified composite belt is shown generally at 50 in FIG. 9 which has three multi-layered fabric backing sections 51, 52, and 53 separated respectively by rubber or rubber-like sections 54 and 55. Another illustration of such a unified composite belt is shown generally at 60 in FIG. 10 which has five fabric backing sections 61 through 65 separated respectively by the rubber or rubber-like sections 66 through 69.

At this point in this method of providing capped edges, the unified composite belt may be ready for the final step in the method or it may desirable, or necessary, to trim or buff or grind, by any suitable means, the surfaces of the rubber or rubber-like sections to make these surfaces flush with the surface of the backing or to achieve some other desired relationship.

The final step of the present inventive method comprises the severing of the unified composite belt along the length of the rubber or rubber-like sections that now separate the fabric backing sections. In FIG. 11, the belt 50 of FIG. 9 is shown severed along the rubber or rubber-like section 54. In this manner, the severing of the belt 50 along both rubber or rubber-like sections 54 and 55 produces a belt 52 with both edges capped with rubber or rubber-like material, and two discardable sections 51 and 53.

In similar fashion, severing the unified composite belt 60 of FIG. 10 along the rubber or rubber-like sections 66 through 69 produces belts 62, 63 and 64 each with both edges capped with rubber or rubber-like material and two discardable sections 61 and 65 each with one edge capped.

Any suitable cutting or severing means may be employed in this final step of the method. As revealed in FIG. 11, the severing may be done at right angles to the surface of cover 12 but this method is not limited in that respect. The severing may be accomplished at any desired angle or in any other desired manner, as indicated by the dotted lines 56 and 57.

In summary then, the present inventive method begins with the provision of a material carrying belt 10, as shown in FIG. 1, having a cover 12 and one or more layers of fabric backing 14 exposed on the belt edges 17 and 18. The belt may have a cover 13 on the bottom surface as illustrated by belt 11 in FIG. 2. The first step of the method comprises the scoring of grooves such as represented by 22 in FIG. 3. These grooves are cut through the fabric backing layer or layers 14 by any suitable means and extend to the surface 28 of the cover 12. These grooves may have perpendicular or slanted sides with respect to the belt surface 24 or the sides of the grooves may be shaped or terraced in any desired manner, illustrations of grooves with terraced sides being shown at 22 in FIG. 3, at 32 in FIG. 4, and at 33 in FIG. 5. Following the scoring of the grooves, and prior to filling the grooves with edge capping material, the surface 28 of the cover 12 may be buffed and the surfaces of the grooves may be treated with a suitable vulcanizing cement or other bonding material to provide proper bonding of the edge capping material in the grooves.

The next step of this method is shown in FIGS. 6, 7 and 8 wherein the grooves are filled with suitable edge capping material as represented by 40, 42 and 44, respectively. This edge capping material may be of a kind that would require hot vulcanizing to cause the edge capping material to form to the configuration of the groove, to be bonded thereto, and to develop its rubber or rubber-like properties. The edge capping material may be of a kind that can be spread or flowed into the groove and be bonded thereto, and that will develop its rubber or rubber-like properties by vulcanizing or by some other curing process. The edge capping material may be preformed and may be precured and attached to the surfaces of the grooves by vulcanizing or other bonding processes. As suggested in these references to the edge capping materials, and to any vulcanizing cement or other bonding material used in filling the grooves, the next step of the method involves a vulcanizing process or other suitable process which results in a unified composite belt such as 50 in FIG. 9 and 60 in FIG. 10 having fabric backing sections with rubber or rubber-like sections therebetween. Excess edge capping at these sections may be trimmed or ground away if desirable or necessary to cause these rubber or rubber-like sections to be flush with the surface 24 of the backing or to be shaped in some other desired configuration. The final step of this method comprises the severing of the unified composite belt along the length of the rubber or rubber-like sections between the fabric backing sections as shown in FIG. 11, thereby separating the unified composite belt into one or more belts with both edges capped and two discardable sections with one edge capped. Thus, capped edge belts having a cover extending to the belt edges and having edges of rubber or rubber-like material securely bonded to the cover and the fabric backing are manufactured with minimized tooling and production costs.

While several forms of the invention have been shown and described, other forms will now be apparent to those skilled in the art. Therefore, it will be understood that the embodiments shown in the drawings and described above are merely for illustrative purposes, and are not intended to limit the scope of the invention which is defined by the claims which follow.

The embodiments of the invention in which an exclusive property or privilege is claimed are defined as follows:

1. In an elongated, material carrying belt comprising a cover impervious to food, moisture and the like having a predetermined thickness, side edges, and opposing surfaces, a backing having at least one layer of fabric material, one surface secured to one of said surfaces of said cover and a second surface generally opposite said cover, and a cap extending along the edge of said backing, the improvement comprising:

said backing having cutout portions extending along the outermost edges thereof and extending inwardly of the outermost edges of said cover and through the thickness of said backing from said second surface to said one surface of said backing whereby a portion of said one surface of said cover is exposed; and capping material separate from said cover filling said cutout portions, covering said exposed portion of said one surface of said cover, and bonded to said cover and said backing to provide a continuous, protective surface which is impervious to food, moisture or the like and extends along and around each edge of the belt.

2. The belt of claim 1 in which said cutout portions are terraced.

3. The belt of claim 1 in which said backing is at least one layer of fabric material impregnated with and bonded to said one cover surface with vulcanizable material, the capping material being bonded to said cover and fabric material by being vulcanized.

4. The belt of claim 1 in which said backing is at least one layer of fabric material impregnated with and bonded to said one cover surface with a vulcanizable material, the capping material being preformed to correspond with the configuration of said cutout portions and being bonded to said cover and fabric material.

5. An elongated, composite, material carrying belt comprising a cover impervious to food, moisture and the like having a predetermined thickness, side edges and opposing surfaces, a backing having at least one layer of fabric material, a predetermined thickness and a first surface secured to one of said surfaces of said cover and a second surface generally opposite said cover, and at least one edge capped with capping material which is joined to said cover to provide a continuous protective surface extending along and around the said one edge of said belt, said one edge of said belt formed by scoring a groove in the fabric backing of said belt, said groove extending lengthwise along said belt and through the thickness of said backing from said second surface to said first surface of said backing whereby a portion of said one cover surface is exposed, said groove being filled with capping material which is impervious to food, moisture and the like, said capping material being secured to the surfaces of said groove and said one surface of said cover, the exposed side surface of said edge being a severed portion through said capping material to provide surfaces at said side and at a portion of the bottom which are impervious to food, moisture and the like.

6. An elongated, material carrying belt in accordance with claim 5 wherein said backing comprises at least one layer of rubber impregnated fabric selected from a group including cotton duck, polyester fabric and rayon fabric.

7. An elongated, material carrying belt in accordance with claim 5 wherein the material used to fill in said groove is selected from a group including uncured rubber, neoprene rubber, nitrile rubber, and silicone rubber.

8. An elongated, material carrying belt is accordance with claim 5 wherein said capping material is vulcanized such that said material is bonded to the surfaces of said groove.

9. The belt of claim 1 wherein said cutout portions each are stepped and include a series of successively narrower step portions progressing from said second surface of said backing toward said cover, the step portion closest to said second surface being the widest while the step portion extending to said one surface of said cover is the narrowest.

10. The elongated, material carrying belt of claim 5 wherein said groove includes sides which are terraced.

11. The elongated, material carrying belt of claim 5 wherein said groove includes at least one side portion which is stepped outwardly from a narrow portion adjacent said one surface of said cover to a widest portion at said second surface of said backing.

12. The elongated, material carrying belt of claim 5 wherein said groove includes a plurality of successively narrower troughs within one another progressing from said second surface of said backing toward said cover, said trough closest to said second surface being the widest while the narrowest trough extends to said one surface of said cover.

13. The belt of claim 1 in which said capping material is a flowable, spreadable capping material, said material being flowed into said cutout portions to fill the same and bonded to said cover and fabric material.

14. The belt of claim 5 in which said capping material is a flowable, spreadable capping material, said material being flowed into said groove to fill the same and bonded to said cover and fabric material.

* * * * *